United States Patent [19]

Hiersig et al.

[11] 3,858,411
[45] Jan. 7, 1975

[54] SHAFT COUPLING FOR TRANSMISSION OF AXIAL THRUST AND TORQUE

[75] Inventors: Heinz M. Hiersig, Dusseldorf-Oberkassel; Klaus Hansgen, Witten; Wolfgang Sudhoff, Dortmund-Mengede, all of Germany

[73] Assignee: Mannesmann-Meer Aktiengesellschaft, Ohlerkirchweg, Monchengladbach, Germany

[22] Filed: May 31, 1973

[21] Appl. No.: 365,543

[30] Foreign Application Priority Data
June 20, 1972 Germany.......................... 2230928

[52] U.S. Cl............................ 64/1 R, 64/1 V, 64/6, 64/19, 64/17 SP, 403/58
[51] Int. Cl............................................. F16d 3/00
[58] Field of Search..... 403/58, 59; 64/17 SP, 17 R, 64/17 A, 1 C, 1 R, 1 V, 6 R, 23, 19, 27 B

[56] References Cited
UNITED STATES PATENTS

| 607,854 | 2/1898 | Huntoon | 403/59 |
| 1,223,924 | 4/1917 | Alexanderson | 64/1 R |
| 1,304,103 | 5/1919 | Runyan | 64/6 |
| 1,648,624 | 11/1927 | Schultz | 403/58 |
| 2,304,766 | 12/1942 | Pratt | 403/58 |

Primary Examiner—Samuel Scott
Assistant Examiner—Randall Heald
Attorney, Agent, or Firm—Smyth, Roston & Pavitt

[57] ABSTRACT

The propeller shaft and the drive unit shaft in a ship's drive system and interconnected by a coupling having two 90° offset forks, each fork having a pin whereby the pin on each fork is interposed between the respective other pin and the shaft end to which the other pin connects directly, the two pins are interconnected by a tension member.

4 Claims, 3 Drawing Figures

SHAFT COUPLING FOR TRANSMISSION OF AXIAL THRUST AND TORQUE

BACKGROUND OF THE INVENTION

The present invention relates to a universal joint type shaft coupling for transmitting axial force as well as torque. The present invention relates particularly to improvements in such a shaft coupling wherein the front end of each shaft to be coupled to the respective other shaft is provided with a fork, the two forks having a 90° offset disposition to each other, and they overlap for being connected with each other by suitable connecting means.

Shaft couplings of the type described often include additionally a follower member on each shaft which cooperate with an intermediate member which in turn is constructed so that the acticulativeness of the coupling is not impeded. Articulated couplings i.e., universal joint couplings in automobiles have to take up only very small axial forces. The situation is quite different for ship drives, where the propeller shaft is connected to a transmission gear. Strong axial thrust is provided here by the propeller which is reacted into the driving train at large.

The gear train proper will be protected by a thrust bearing, but the coupling in that train should be protected against the axial propeller thrust also. Therefore, a suitable thrust bearing is to be interposed between coupling and propeller. However, such thrust bearing would then be provided for just that purpose. Such a separate part should be avoided because one usually wants all drive functions to be combined in the transmission gearing in order to permit installation of the drive unit as a complete engine-transmission gearing unit, and it is undesirable to have to install additional elements in the drive train which provide for "local" adaptation. This is particularly true in those cases where noise attenuation is desirable and where accordingly the drive as a whole is suspended resiliently.

SUMMARY OF THE INVENTION

It is an object of the present invention to provide for a shaft coupling which permits utilization of an axial thrust bearing in the transmission gear, i.e., as part of the drive unit as such. In other words it is an object of the present invention to provide a universal joint type shaft coupling which is capable of transmitting axial thrust, for example, so that the thrust bearing can be located on the driving side of the coupling, and does not have to be interposed between coupling and propeller shaft. The coupling, therefore, should be capable of taking up the axial thrust for transmitting such thrust without losing transverse and angular mobility. It is another object of the invention to provide a shaft coupling that will not easily buckle or bend off the drive shaft.

In accordance with the preferred embodiment of the invention it is suggested to provide two joints between the forks which are connected to the respective shafts. These joints are located in axially spaced relation, whereby the one joint as directly connected to a first one of the forks is positioned closer to the axial end face of the shaft carrying the second fork than the joint on the second fork is positioned from that end face, and vice versa, and both joints are hingedly interconnected by a tension member.

In the preferred form of practicing the invention, pins may be inserted between the respective fork ends, which spaced apart pins have a 90° angularly offset disposition to each other, and a tension member interconnects the two pins articulatedly or hingedly for individual pivoting on the respective pin axes. Accordingly, the pin that interconnects the prongs of one fork is closer to the base of the other fork and vice versa. At least one of the pins is connected articulatedly to the tension member via a resiliently reacting insert. The insert may comprise a rigid or stiff ball-sleeve, receiving the pin and having a resilient liner which in turn is received in a sufficiently large bore in the tension member and connected thereto.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a coupling for interconnecting a shaft 1 with a shaft 2, for transmission of torque as well as axial thrust. For example, shaft 1 may be a propeller shaft in a ship's drive, while shaft 2 is the driving shaft connecting to the drive unit of the ship.

Figure 1:
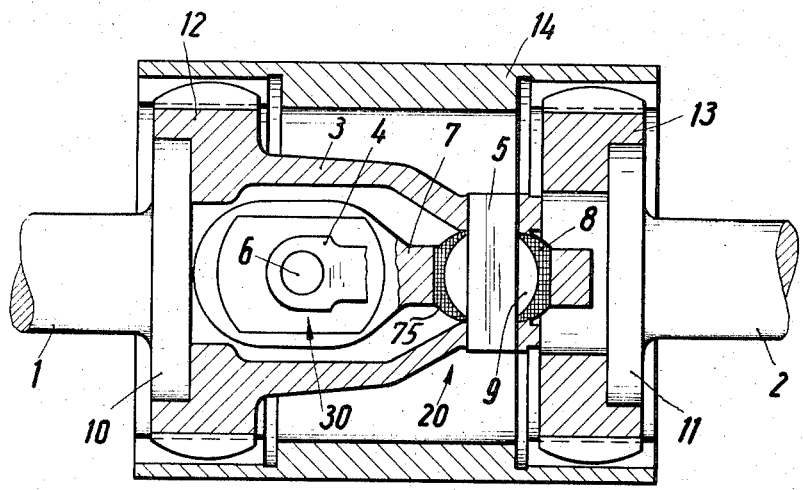
FIG. 1 is a cross-section through a shaft coupling constructed in accordance with the preferred embodiment of the invention.

The two shafts 1 and 2 respectively have end flanges 10 and 11 which define the axial ends proper of the shafts. A fork 3 of the type of a bearing yoke is mounted on flange 10; a similar fork or yoke 4 is mounted on flange 4. These forks are arranged with a 90° angle offset disposition as between the respective planes of extension of these fork prongs.

The forks 3 and 5 overlap and two joints or links 20 and 30 are interposed. Joint 20 connects to fork 3, but is located closer to flange 11 than joint 30 which is connected to fork 4, and joint 30 is closer to the flange 10 than joint 20. To state it differently, joint 30 as connected directly to fork 4 is located between joint 20 and flange 10, while joint 20 as connected directly to fork 3 is located between joint 30 and flange 11. A tie rod like tension member 7 interconnects the two joints.

As can readily be seen from the illustration, the free ends of each of the forks 3, 4 respectively carry pins 5, 6 just as in a Cardan joint. However, pin 5 as interconnecting the prongs of fork 3 is located closer to flange 11 than pin 6, while the analogous rule applies as to pin 6 which interconnects the prongs of fork 4.

Pins 5 and 6 are respectively parts of the joints 20, 30 and the pins are hingedly interconnected by means of a tension member 7 which receives both pins and is capable, per se, of pivoting on each of the 90°-offset axes of the pins. The bore 75 in member 7 which receives pin 5 is significantly larger than the pin itself. The annular space between the walls of bore 75 and the pin 5 receives an annular, overall-resiliently reacting element.

This resilient element in bore 75 is comprised of a solid or rigid sleeve 9 made of metal or plastic, with an inner diameter matching the (outer) diameter of pin 5. A rubber elastic seat 8 is slipped onto the outer ball shaped periphery of sleeve 9 and has a cylindrical surface portion for being received in bore 75. Actually, this elastic line 8 is bonded to the cylindrical wall of bore 75. This resilient hinge is shown for pin 5 only, a similar resilient hinge could be provided on pin 6 also.

The forks 3 and 4 are additionally provided respectively with follower elements 12, 13 being quite close to flanges 10, 11. These follower elements or members are interconnected by a sleeve member 14. Particularly, member 14 connects respectively to elements 12 and 13 via self centering or compensating gear couplings.

Figure 2:
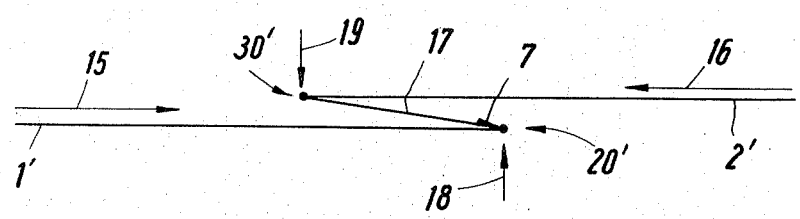
FIG. 2 is a force and action diagram for the coupling shown in FIG. 1 to explain the thrust transmission action of the coupling.
Figure 3:
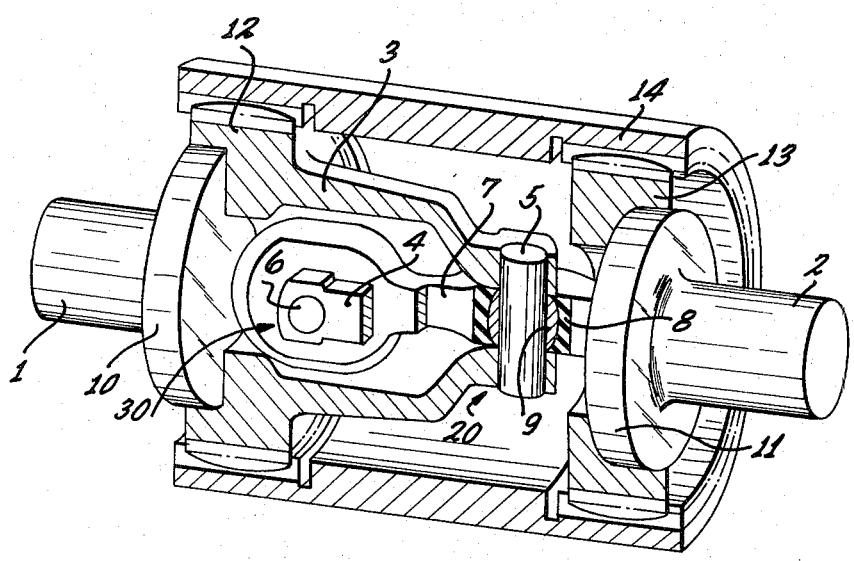
FIG. 3 is a perspective view of the construction shown in FIG. 1.

The FIG. 2 depicts force vectors and other relevant directions. Reference numerals 1' and 2' are respectively the shaft axes and stand in respresentation of the shafts themselves in this schematic illustration. In order to demonstrate the invention better it is intentionally assumed that the axes 1' and 2' are misaligned. The points 20' and 30' denote the action centers of joints 20 and 30, and these centers are of course in alignment with the respective axis of the shaft to whose fork they are connected directly. The double arrow 17 represents here the tension member 7 as acting between these two joints 20 and 30.

Assuming that an axial thrust is applied by the propeller shaft 1 to the system, and as denoted by arrow 15, a counter force 16 is provided via shaft 2 as held directly or indirectly for example in a thrust bearing. Thrust force 15 acts directly on joint 20, while counter or reaction thrust force 16 acts on joint 30. Thus, these opposing forces are reacted into member 7 (17). The member 7 thus acts as a tension rod whereby the tension forces run through the joints 20, 30 respectively at either end.

As a consequence, a residual or component force 18 acts on point 20' of joint 20, while an oppositely directed force component 19 acts on joint 30. These forces 18, 19 are the larger the more the axes are misaligned; forces 18, 19 are zero for strict coaxial relation of the shafts 1 and 2.

Not only does this particular coupling prevent buckling of the shafts but the system is self centering and self aligning if the shaft mounts so permit. The compensating characteristics of the follower 12, 13 - member 14 arrangement permits axial misalignment to occur without detriment to the follower operation, and member 14 is not in the least an impediment for the coupling as a whole.

Member 7 may well be subjected to compression which is important because in case of reversal of the drive, vectors 15, 16 reverse direction;

The invention is not limited to the embodiments described above but all changes and modifications thereof not constituting departures from the spirit and scope of the invention are intended to be included.

We claim:

1. Shaft coupling for interconnecting two shafts and having a first fork on one shaft and a second fork on the other shaft, angularly offset by 90° to the first fork and overlapping the first fork for coupling position of the two forks, there being additional follower connection means between the two shafts in lateral offset disposition from the fork and located beyond the expected range of axial angular displacement of the shafts as it effects the disposition of the forks, the improvement comprising:

a first joint on the first fork; a second joint on the second fork, the first joint disposed between the second joint and the end of the one shaft from which projects the second fork, the second joint disposed between the first joint and the end of the other shaft from which projects the first fork; and a tension member hingedly interconnecting the first and the second joint.

2. In a coupling as in claim 1, the forks each having two prongs, the first joint including a pin between the prongs of the first fork, the second joint including a pin between the prongs of the second fork, the tension member having bores for pivotally receiving each of the pins and pivoting on the respective axis of each of the pins.

3. In a coupling as in claim 2, wherein the tension member has at least one bore having diameter larger than the one of the pin as received by the one bore, and resilient means interposed between the one pin and the bore.

4. In a coupling as in claim 3 the resilient means including a nonresilient sleeve receiving the one pin and a resilient liner secured to the bore of the tension member, the sleeve capable of turning on the pin.

* * * * *